United States Patent
Nold et al.

(10) Patent No.: US 8,360,334 B2
(45) Date of Patent: Jan. 29, 2013

(54) WATER HEATING CONTROL SYSTEM AND METHOD

(76) Inventors: Steve Nold, Placentia, CA (US); Thomas J Debin, Fullerton, CA (US)

( * ) Notice: Subject to any disclaimer, the term of this patent is extended or adjusted under 35 U.S.C. 154(b) by 744 days.

(21) Appl. No.: 12/461,337

(22) Filed: Aug. 7, 2009

(65) Prior Publication Data

US 2011/0031323 A1 Feb. 10, 2011

(51) Int. Cl.
G05D 23/00 (2006.01)
G05B 15/02 (2006.01)
G05B 21/00 (2006.01)
G06F 11/00 (2006.01)

(52) U.S. Cl. .............. 236/51; 700/9; 700/276; 702/188

(58) Field of Classification Search ............... 236/20 R, 236/46 R, 51; 700/276, 9, 19, 20; 702/188
See application file for complete search history.

(56) References Cited

U.S. PATENT DOCUMENTS

| | | | |
|---|---|---|---|
| 4,522,333 A | 6/1985 | Blau, Jr. et al. | |
| 4,568,821 A | 2/1986 | Boe | |
| 4,832,259 A | 5/1989 | Vandermeyden | |
| 5,056,712 A | 10/1991 | Enck | |
| 5,626,287 A | 5/1997 | Krause et al. | |
| 6,208,806 B1 * | 3/2001 | Langford | 392/464 |
| 6,919,790 B2 | 7/2005 | Kanazawa | |
| 7,015,432 B2 | 3/2006 | Valbh et al. | |
| 7,020,387 B1 | 3/2006 | Andrakin | |
| 7,292,898 B2 | 11/2007 | Clark et al. | |
| 8,155,900 B1 * | 4/2012 | Adams | 702/62 |
| 2007/0175883 A1 | 8/2007 | Miu et al. | |
| 2009/0271725 A1 * | 10/2009 | Dirla | 715/771 |
| 2009/0307178 A1 * | 12/2009 | Kuhns et al. | 706/54 |

FOREIGN PATENT DOCUMENTS

| | | |
|---|---|---|
| CN | 1370962 | 9/2002 |
| JP | 2002147839 | 5/2002 |
| JP | 2002199471 | 7/2002 |
| JP | 2003279121 | 10/2003 |
| JP | 2004177033 | 6/2004 |
| WO | WO 2007139587 A1 * | 12/2007 |

OTHER PUBLICATIONS

Paper on remote control of electrical appliances including water heaters, 2 pages printed from the Internet, Jul. 9, 2008. http://www.elect.mrt.ac.1k/p7__2001__02.pdf.
"Midea Remote Control Electric Water Heater Solution", by GuangDongGuangQian Technology Co. Ltd., 1 page printed from the Internet, Jul. 9, 2008. http://www.qd-emb.org/en/solution__odm__3.php.
"Development of an Internet Home Automation System using Java and Dynamic DNS Service" by IEEE Xplore, 1 page printed from the Internet, Jul. 9, 2008. http://ieeexplore.ieee.org/Xplore/login.jsp?url=/ie15/10544/33357/01578974.pdf?temp=x.

* cited by examiner

Primary Examiner — Chen Wen Jiang
(74) Attorney, Agent, or Firm — Richard C. Litman

(57) ABSTRACT

The water heating control system and method tracks, monitors and controls energy consumed by systems and/or equipment including, but not limited to, hot water, HVAC, pools, and spas. The system and method controls a given device by utilizing historical and real-time information collected from a system of similar devices at the same and similar locations, as inputs to control processes which, utilizing the blended real-time and historical data, improve device management, including energy savings and maintenance of the entire system of devices over time.

15 Claims, 2 Drawing Sheets

US 8,360,334 B2

WATER HEATING CONTROL SYSTEM AND METHOD

BACKGROUND OF THE INVENTION

1. Field of the Invention

The present invention relates to automatic or computerized control systems, and particularly to a water heating and control system that tracks, monitors and controls energy consumed by water heating systems.

2. Description of the Related Art

Pools, spas, hot water heater, and the like often have a local control system. Microprocessors and sensors are frequently used in the maintenance and control of temperature, pump operation, filter cycles, etc. These control systems can run twenty-four hours a day, seven days per week, year-round, providing local control over the operational parameters of the pool or spa. Typically, these are self-contained, closed-loop systems that function autonomously without intervention and/or control beyond the local vicinity of the physical device; i.e., no networked communication exists beyond the local surroundings. Since there is no networked communication beyond the local, autonomous system, errors can creep into the system without being quickly detected, since there is no reference system to check the local autonomous system against.

Thus, a water heating control system and method solving the aforementioned problems is desired.

SUMMARY OF THE INVENTION

The water heating control system and method tracks, monitors and controls energy consumed by systems and/or equipment including, but not limited to, hot water, HVAC, pools, spas, and the like. The system and method control a given device by utilizing historical and real-time information collected from a system of similar devices at the same and similar locations as inputs to control methods, which thereby improve device management, including energy savings and maintenance of the entire system of devices over time. The water heating control system keeps supply temperatures to a minimum, which reduces standby heat loss and therefore reduces energy consumption. Historical data is recorded and used to calculate a low and high temperature range for each time period of each day. Current data is then analyzed at a much smaller time period and, using a moving average, the supply temperature is determined. Website and onsite monitoring allow for alarms of out of range conditions and routine reports.

The system is site specific to the extent that each system is treated with its unique variables. The onsite device collects data (supply temperature, return temperature, cold water supply temperature, outside air temperature, heater run time, pump run time and NOAA weather data) for each site according to latitude and longitude. This data is transmitted to a web-based database where it is stored, analyzed and acted upon. Predictions are calculated as to the amount of heat loss, water temperature drop and outside air temperature. These values are used to determine the extent of standby heat loss, further adjust the supply temperature accordingly, compute and record hot water load, standby heat loss and heater recovery rates. The hot water load, standby heat loss and heater recovery rates are compared to historical patterns for sudden or even gradual changes, other similar systems on the site or on other sites to find anomalies and alarm these conditions for investigation and repair. Monitoring, alarms, and reports prevent tampering and provide maintenance and routine reports.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
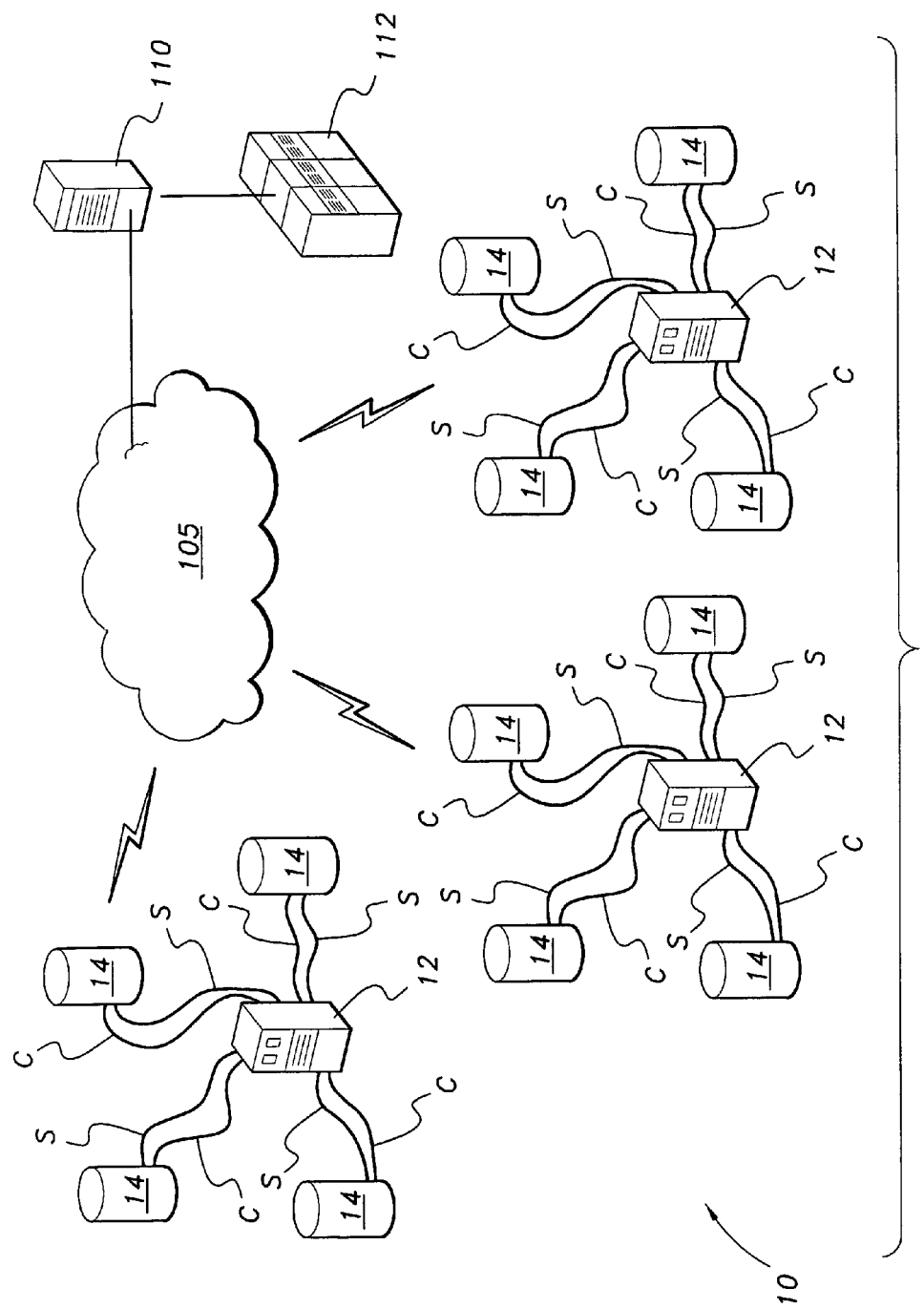
FIG. 1 is a block diagram of a water heating control system, according to the present invention.
Figure 2:
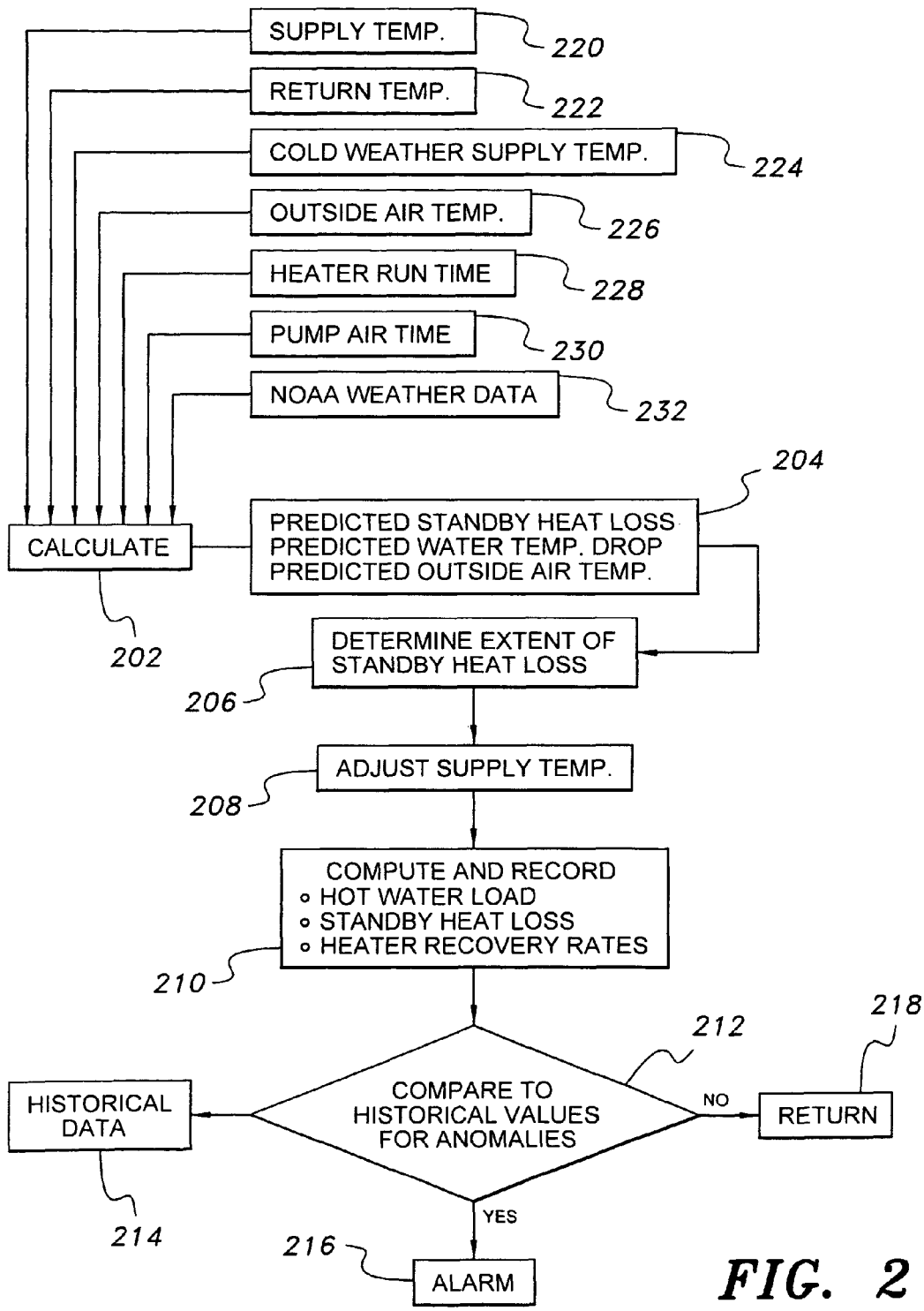
FIG. 2 is a flowchart showing processing methods of the water heating control system, according to the present invention.

As shown in FIGS. 1 and 2, the present invention is a water heating control system 10 and method that tracks, monitors and controls energy consumed by systems and/or water heating units 14, including, but not limited to, hot water, HVAC, pools, spas, and the like. The system and method 10 controls a given device 14 by utilizing historical and real-time information collected from a system of similar devices 14 at the same and similar locations, in conjunction with other established control methods, to thereby improve device management, including energy savings and maintenance of the entire system of devices over time.

The water heating control system 10 keeps supply temperatures to a minimum, which reduces standby heat loss and therefore reduces energy consumption. Historical data 214 is transmitted wirelessly from local control units 12 via the Internet or an intranet 105 to a central control computer 110 and recorded in a database held by a mass storage unit 112. The historical data 214 is used to calculate a low and high temperature range for each time period of each day. Current data is then analyzed at a much smaller time period, e.g., at a 10 Hz rate, and using a moving average, the supply temperature is determined. The central control computer 110 is equipped with web server software and monitoring software, thereby enabling website and onsite monitoring, which allows for alarms of out of range conditions and routine reports. The system 10 is site specific in that each of the cluster systems, as shown in FIG. 1, has its own uniquely identified variables. The onsite local controller 12 collects supply temperature, return temperature, cold water supply temperature, outside air temperature, heater run time, pump run time, and NOAA weather data for each cluster according to latitude and longitude. Data is acquired from the heating unit 14 via sensor line S. The local controller 12 can control the heating unit 14 via control line C. The acquired data is then transmitted to a web-based database residing in mass storage unit 112 of central control computer 110, where it is stored, analyzed and processed.

Computations may be distributed among the processors 12 and 110 or localized in the central control computer 110. As shown in FIG. 2, predictions are calculated as to the amount of heat loss, water temperature drop and outside air temperature. The supply temperature 220, return temperature 222, cold weather supply temperature 224, outside air temperature 226, heater run time 228, pump air time 230 and National Oceanic and Atmospheric Administration (NOAA) weather data 232 are all input to a calculation algorithm. These values are used to determine the extent of standby heat loss, further adjust the supply temperature accordingly, compute and record hot water load, standby heat loss and heater recovery rates. The hot water load, standby heat loss and heater recovery rates are compared to historical patterns for sudden or even gradual changes, other similar systems on the site or on other sites to find anomalies and alarm these conditions for investigation and repair.

As shown in FIG. 2, predicted values 204 resulting from the calculate step 202 include predicted standby heat loss, predicted water temperature drop, and predicted outside air temperature. Then the processor 110 determines the extent of standby heat loss at step 206. Subsequently the processor 110 adjusts the supply temperature at step 208. At step 210 the hot water load, standby heat loss and heater recovery rates are computed and recorded. The comparison to historical values 214 for anomalies occurs at step 212. If there are no anomalies, control is returned to normal processing at step 218. If there are anomalies, visual and/or aural alarms are initiated at step 216.

Monitoring, alarms, and reports prevent tampering and provide maintenance and routine reports. The system 10 considers a controlled device in the context of a larger system of similar devices (note the clusters of similar devices in FIG. 1); making better control decisions from more data sources; identifying discrepancies in usage, and accounting for degradation of equipment, and local other local anomalies.

For example, the system 10 could be used to control water heating for several apartment buildings or multifamily unit properties. A plurality of water heating devices 14 (e.g. water heaters) exists at each property, each servicing a number of units at the property. The control system and method 10 regards all of the above devices 14 as being divided into logical groups to be remotely administered by a central Master Control software program running on central master control computer 110.

The water heating control system 10 assigns the plurality of devices 14 at the disparate locations into logical groups. Each device 14 belongs to a logical group and all devices 14 within a logical group are measured, monitored and controlled with respect to each other. For example, devices 14 at sites A and B are assigned to group G1 due to their heating the same number of dwellings and thus having the same theoretical workload. Devices number 14 at site A and B each heat more units than those in group G1, and therefore are assigned to a different group G2. All devices 14 at site C heat an identical number of units, but environmental factors are different than those at sites A or B, resulting in a different theoretical workload for each unit. Therefore all devices at site C are assigned to group G3.

The water heating control system utilizes the principal that individual devices experience performance-impacting deterioration over time, and the rate of deterioration for any given unit can vary as a function of usage, environment and inherent hardware defects.

By cross-referencing key performance indicators (i.e. measured parameters: time on, total required burn time) with those of similar units within the group, issues unique to a given device can be identified early and addressed in a timely fashion. The steps illustrated in FIG. 2 are utilized in the cross-referencing processing and performed by the water heating control system 10. Preferably, the cross-referencing process is executed in parallel with the regular control activities of the master control software.

Given a set of water heating systems, each comprised of various devices, e.g., HVAC, hot water units, pool heating units, spa heating units, or the like, at a given site, the water heating control system automatically monitors and controls each unit within such water heating systems by comparing parametric measurements of the unit with historical data of that subsystem and current and historical data of other similar units within the same system and current and historical data of similar units within separate but similar systems. Moreover, the water heating control system predicts and prescribes required maintenance of the heating units based on comparisons of measured workload with that of similar heating units throughout the set of heating unit systems, including but not limited to such factors as manufacturer's equipment make, equipment age and location of the heating equipment.

The water heating control system load balances heating units within heating systems (particularly HVAC units) by measuring time and amount of work performed by the units relative to each other and by comparing to similar units in similar heating systems.

Moreover, the water heating control system identifies site specific environmental factors or usage patterns adversely impacting energy usage, e.g., slab leaks, cleaning crews not turning off water, and the like.

The water heating control system presents energy savings reports, sensor exception reports, recommended maintenance reports system exception reports identifying significant deviations of a single unit from either its own past history, or the past history of other similar units in similar systems, in a convenient, easy to understand, graphical display.

In the case where the controlled devices are hot water heaters for outdoor pools, current local weather conditions are recorded by the device and factored in with previous historical data from the network of controlled systems when constructing base and future calculations for heat loss from a body of standing water. Potential heat gain from the sun is also calculated in this manner. Calculations for the predicted heater start time are improved by comparing predicted heater run time with actual heater run time, and adjusting for discrepancies to improve calculations. Adjustments improve energy savings by allowing the heater to remain off for as long as possible so that the desired temperature is met at the proper time. Solar heat gain is gauged on an hourly basis and corrected by the pool heater if necessary. The control system may be included with a new water heater or used to replace existing control systems.

It is to be understood that the present invention is not limited to the embodiments described above, but encompasses any and all embodiments within the scope of the following claims.

We claim:

1. A computerized water heating control system, comprising:
   means for automatically monitoring and controlling a plurality of water heating units within a local water heating system;
   means for comparing parametric measurements associated with each of the water heating units;
   at least one sensor adapted for acquiring current water heating unit data from the plurality of water heating units in the local water heating system, the at least one sensor being connected to the automatically controlling and acquiring means;
   means for acquiring water heating unit historical data for both the local water heating system and for a group of similar heating systems, the means for acquiring including means for accessing a remote database through a network;
   means for comparing current and historical data of similar water heating units within the local water heating system;

means for comparing current and historical data for a water heating unit within the local water heating system to similar water heating units within the group of similar water heating systems;

means for recording current local weather conditions;

means for factoring in said current local weather conditions with previous historical data from the network of controlled systems when constructing base and future calculations for heat loss from a body of standing water;

means for calculating potential heat gain from the sun means for improving calculations for the predicted heater start time, said calculations improving means comparing predicted heater run time with actual heater run time, and adjusting for discrepancies;

means for adjusting the system, the system adjusting means allowing the heater to remain off for as long as possible while maintaining desired temperature vs. time profile; and solar heat gain gauging means occurring on an hourly basis and corrected by the pool heater, if necessary.

2. The water heating control system according to claim 1, further comprising means for predicting and prescribing required maintenance of said water heating units based on comparisons of measured workload with that of similar water heating units throughout the group of water heating systems, including make, age and location of the water heating unit.

3. The water heating control system according to claim 1, further comprising means for load balancing water heating units within water heating systems by measuring time and amount of work performed by the units relative to each other and by comparing to similar units in similar systems.

4. The water heating control system according to claim 3, wherein the water heating control system is an HVAC unit.

5. The water heating control system according to claim 1, further comprising means for identifying site specific environmental factors or usage patterns adversely impacting energy usage.

6. The water heating control system according to claim 1, further comprising means for presenting Energy Sayings Reports, Sensor Exception Reports, Recommended Maintenance Reports, and System Exception Reports, in a graphical display, identifying significant deviations of a single unit from its own past history and from the past history of other similar units in similar systems.

7. The water heating control system according to claim 1, further comprising:

means for acquiring water heating system supply temperature;

means for acquiring water heating system return temperature;

means for acquiring water heating system cold water supply temperature;

means for acquiring outside air temperature;

means for acquiring water heating system heater run time;

means for acquiring water heating system pump run time;

means for acquiring NOAA weather data;

means for calculating the acquired data to compute a predicted standby heat loss, a predicted water temperature drop, and a predicted outside air temperature;

means for determining the extent of the standby heat loss;

means for adjusting supply temperature;

means for computing and recording hot water load, standby heat loss, and heater recovery rates;

means for comparing said hot water load, standby heat loss, and heater recovery rates to historical values for anomalies; and means for alerting the system and users if the anomalies exist.

8. A water heating control method, comprising the steps of:

automatically monitoring and controlling a plurality of water heating units within a water heating system;

comparing parametric measurements associated with each of said water heating units;

acquiring water heating unit historical data;

comparing current and historical data of other similar water heating units within the same water heating system;

comparing current and historical data of similar water heating units within separate but similar water heating systems;

recording current local weather conditions;

factoring in the current local weather conditions with previous historical data from the network of controlled water heating systems when constructing base and future calculations for heat loss from a body of standing water;

calculating potential heat gain from the sun;

improving calculations for the predicted heater start time, the calculations improving step including comparing predicted heater run time with actual heater run time and adjusting for discrepancies;

adjusting the water heating system in order to allow the heater to remain off for as long as possible while maintaining desired temperature vs. time profile; and gauging solar heat gain on an hourly basis and corrected by the pool heater if necessary.

9. The water heating control method according to claim 8, further comprising the steps of predicting and prescribing required maintenance of said water heating units based on comparisons of measured workload with that of similar water heating units throughout the set of water heating systems, including make, age and location of the water heating unit.

10. The water heating control method according to claim 8, further comprising the step of balancing load of the water heating units within water heating systems by measuring time and amount of work performed by the units relative to each other and by comparing to similar units in similar water heating systems.

11. The water heating control method according to claim 10, wherein the water heating control system is an HVAC unit.

12. The water heating control method according to claim 8, further comprising the step of identifying site specific environmental factors or usage patterns adversely impacting energy usage.

13. The water heating control method according to claim 8, further comprising the step of presenting Energy Sayings Reports, Sensor Exception Reports, Recommended Maintenance Reports, System Exception Reports, in a graphical display, identifying significant deviations of a single water heating unit from either its own past history, or the past history of other similar water heating units in similar water heating systems.

14. The water heating control method according to claim 8, further comprising the steps of:

acquiring water heating system supply temperature;

acquiring water heating system return temperature;

acquiring water heating system cold water supply temperature;

acquiring outside air temperature;

acquiring water heating system heater run time;

acquiring water heating system pump run time;

acquiring NOAA weather data;

utilizing the acquired data in a calculation that computes a predicted standby heat loss, computes a predicted water temperature drop, and computes a predicted outside air temperature;
determining the extent of the standby heat loss;
adjusting supply temperature;
computing and recording hot water load, standby heat loss, and heater recovery rates;
comparing said hot water load, standby heat loss, and heater recovery rates to historical values for anomalies; and
alerting the system and users if the anomalies exist.

15. A computerized water heating control system, comprising:
   means for automatically monitoring and controlling a plurality of water heating units within a local water heating system;
   means for comparing parametric measurements associated with each of the water heating units;
   at least one sensor adapted for acquiring current water heating unit data from the plurality of water heating units in the local water heating system, the at least one sensor being connected to the automatically controlling and acquiring means;
   means for acquiring water heating unit historical data for both the local water heating system and for a group of similar heating systems, the means for acquiring including means for accessing a remote database through a network;
   means for comparing current and historical data of similar water heating units within the local water heating system;
   means for comparing current and historical data for a water heating unit within the local water heating system to similar water heating units within the group of similar water heating systems;
   means for acquiring water heating system supply temperature;
   means for acquiring water heating system return temperature;
   means for acquiring water heating system cold water supply temperature;
   means for acquiring outside air temperature;
   means for acquiring water heating system heater run time;
   means for acquiring water heating system pump run time;
   means for acquiring NOAA weather data;
   means for calculating the acquired data to compute a predicted standby heat loss, a predicted water temperature drop, and a predicted outside air temperature;
   means for determining the extent of the standby heat loss;
   means for adjusting supply temperature;
   means for computing and recording hot water load, standby heat loss, and heater recovery rates;
   means for comparing said hot water load, standby heat loss, and heater recovery rates to historical values for anomalies; and
   means for alerting the system and users if the anomalies exist.

* * * * *